US012068786B2

United States Patent
Gunzelmann et al.

(10) Patent No.: US 12,068,786 B2
(45) Date of Patent: Aug. 20, 2024

(54) RECEIVER WITH PHOTONIC ANTENNA ARRAY

(71) Applicant: Apple Inc., Cupertino, CA (US)

(72) Inventors: Bertram R Gunzelmann, Koenigsbrunn (DE); Nedim Muharemovic, Nuremberg (DE); Zdravko Boos, Munich (DE); Ramin Khayatzadeh, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/944,726

(22) Filed: Sep. 14, 2022

(65) Prior Publication Data
US 2024/0089005 A1  Mar. 14, 2024

(51) Int. Cl.
*H04B 10/50* (2013.01)
*G02F 1/21* (2006.01)
*H01Q 3/26* (2006.01)

(52) U.S. Cl.
CPC ......... *H04B 10/505* (2013.01); *H01Q 3/2676* (2013.01); *G02F 1/212* (2021.01)

(58) Field of Classification Search
CPC ...... H04B 10/505; G02F 1/212; H01Q 3/2676
(Continued)

(56) References Cited

U.S. PATENT DOCUMENTS

| 2007/0160318 A1* | 7/2007 | Jao | G02F 1/225 |
| | | | 385/3 |
| 2010/0221015 A1* | 9/2010 | Williams | G01S 3/22 |
| | | | 398/115 |

(Continued)

FOREIGN PATENT DOCUMENTS

| CN | 101964683 B | * | 5/2013 |
| JP | 2000214199 A | * | 8/2000 |
| JP | 2000304792 A | * | 11/2000 |

OTHER PUBLICATIONS

Kamada et al; Proposal of Highly Efficient Quantum Well Microring Resonator-Loaded Optical Phase Modulator Integrated with Antenna-Coupled Electrodes for Radio-over-Fiber; Feb. 2021; MDPI photonics; pp. 1-14. (Year: 2021).*

(Continued)

*Primary Examiner* — Amritbir K Sandhu
(74) *Attorney, Agent, or Firm* — Treyz Law Group, P.C.; Michael H. Lyons

(57) ABSTRACT

An electronic device may include a receiver having a light source that provides an optical signal to an optical splitter. An optical combiner may be coupled to the optical splitter over a set of parallel optical paths. A phased antenna array may have a set of antennas disposed on the optical paths. Each antenna may include an optical modulator disposed on a respective one of the optical paths and an antenna resonating element coupled to the modulator. Incident radio-frequency signals may produce electrical signals on the antenna resonating elements. Optical phase shifters may provide optical phase shifts to the optical signal. The modulators may modulate the optical local oscillator signal using the electrical signals. The optical combiner may generate a combined signal by combining modulated optical signals from the optical paths. A demodulator may recover wireless data from the radio-frequency signals using the combined signal.

21 Claims, 5 Drawing Sheets

(58) Field of Classification Search
USPC .......................................................... 398/183
See application file for complete search history.

(56) References Cited

U.S. PATENT DOCUMENTS

| | | | | |
|---|---|---|---|---|
| 2012/0251029 | A1* | 10/2012 | Kobrinsky | G02F 1/035 |
| | | | | 385/2 |
| 2017/0244450 | A1* | 8/2017 | Urzhumov | H04B 7/0452 |
| 2019/0305849 | A1* | 10/2019 | Murakowski | H04B 10/00 |
| 2020/0300901 | A1* | 9/2020 | Murata | G01R 29/0885 |
| 2023/0090151 | A1* | 3/2023 | Gunzelmann | H04B 10/25752 |
| | | | | 398/115 |

OTHER PUBLICATIONS

Rodney; Integrated Antenna/Electro-Optic Modulator for RF Photonic Front-Ends; Jun. 2011; proceedings of International Microwave Symposium; pp. 1-6. (Year: 2011).*

Rodney et al; Integrated Antenna/Electro-Optic Modulator for RF Photonic Front-Ends; Jun. 2011 ; Proceedings of International Microwave Symposium; pp. 1-6. (Year: 2011).*

U.S. Appl. No. 17/834,695, filed Jun. 7, 2022.
U.S. Appl. No. 17/827,120, filed May 27, 2022.
U.S. Appl. No. 17/892,961, filed Aug. 22, 2022.
U.S. Appl. No. 17/892,849, filed Aug. 22, 2022.

* cited by examiner

RECEIVER WITH PHOTONIC ANTENNA ARRAY

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. In addition, it can be difficult to provide wireless circuitry that supports these frequencies with satisfactory levels of wireless performance.

SUMMARY

An electronic device may include wireless circuitry having a receiver. The receiver may include a light source that provides an optical signal to an optical splitter. An optical combiner may be coupled to the optical splitter over a set of parallel optical paths. The optical combiner may have an output coupled to a bandpass filter (BPF). The BPF may be coupled to a demodulator.

The wireless circuitry may include a phased antenna array. The phased antenna array may have a set of antennas disposed on the set of parallel optical paths. Each antenna may include an electro-optical modulator disposed on a respective one of the parallel optical paths and an antenna resonating element coupled to the electro-optical modulator. The antennas may cover a single polarization or two orthogonal polarizations. Optical phase shifters may be disposed on the parallel optical paths. If desired, the optical phase shifters may be integrated into the electro-optical modulators.

Radio-frequency signals may be incident upon the phased antenna array. The radio-frequency signals may produce electrical signals on the antenna resonating elements. The optical phase shifters may provide optical phase shifts to the optical signal. The electro-optical modulators may modulate the optical local oscillator signal using the electrical signals. The optical combiner may generate a combined signal by combining the modulated optical signals from the parallel optical paths. The band pass filter may filter out the optical signal and a first sideband from the combined signal to produce a filtered optical signal. The demodulator may recover wireless data from the radio-frequency signals using the filtered optical signal. The optical phase shifters and the optical combiner may serve to produce the array response for the phased antenna array, allowing the phased antenna array to receive the radio-frequency signals from a particular direction (which may change over time).

An aspect of the disclosure provides an electronic device. The electronic device can include a light source. The electronic device can include a demodulator. The electronic device can include an optical path between the light source and the demodulator. The electronic device can include an electro-optical modulator disposed on the optical path and having an electrode. The electronic device can include an antenna resonating element coupled to the electrode of the electro-optical modulator.

An aspect of the disclosure provides wireless circuitry. The wireless circuitry can include a light source configured to generate an optical signal. The wireless circuitry can include an optical combiner. The wireless circuitry can include an optical splitter. The wireless circuitry can include a set of optical paths coupled in parallel between the optical combiner and the optical splitter, the optical splitter being configured to couple the optical signal onto the set of optical paths. The wireless circuitry can include a phased antenna array having a set of antennas disposed on the set of optical paths, wherein the set of antennas is configured to receive radio-frequency signals and is configured to modulate the optical signal using the received radio-frequency signals.

An aspect of the disclosure provides wireless circuitry. The wireless circuitry can include a first optical modulator disposed on a first optical path and having a first electrode. The wireless circuitry can include a first antenna resonating element coupled to the first electrode, the first antenna resonating element being configured to receive a radio-frequency signal and the first electro-optical modulator being configured to modulate an optical signal using the received radio-frequency signal. The wireless circuitry can include a second optical modulator disposed on a second optical path and having a second electrode. The wireless circuitry can include a second antenna resonating element coupled to the second electrode, the second antenna resonating element being configured to receive the radio-frequency signal and the second electro-optical modulator being configured to modulate the optical signal using the received radio-frequency signal. The wireless circuitry can include an optical combiner coupled to the first and second optical paths.

DETAILED DESCRIPTION

Figure 1:
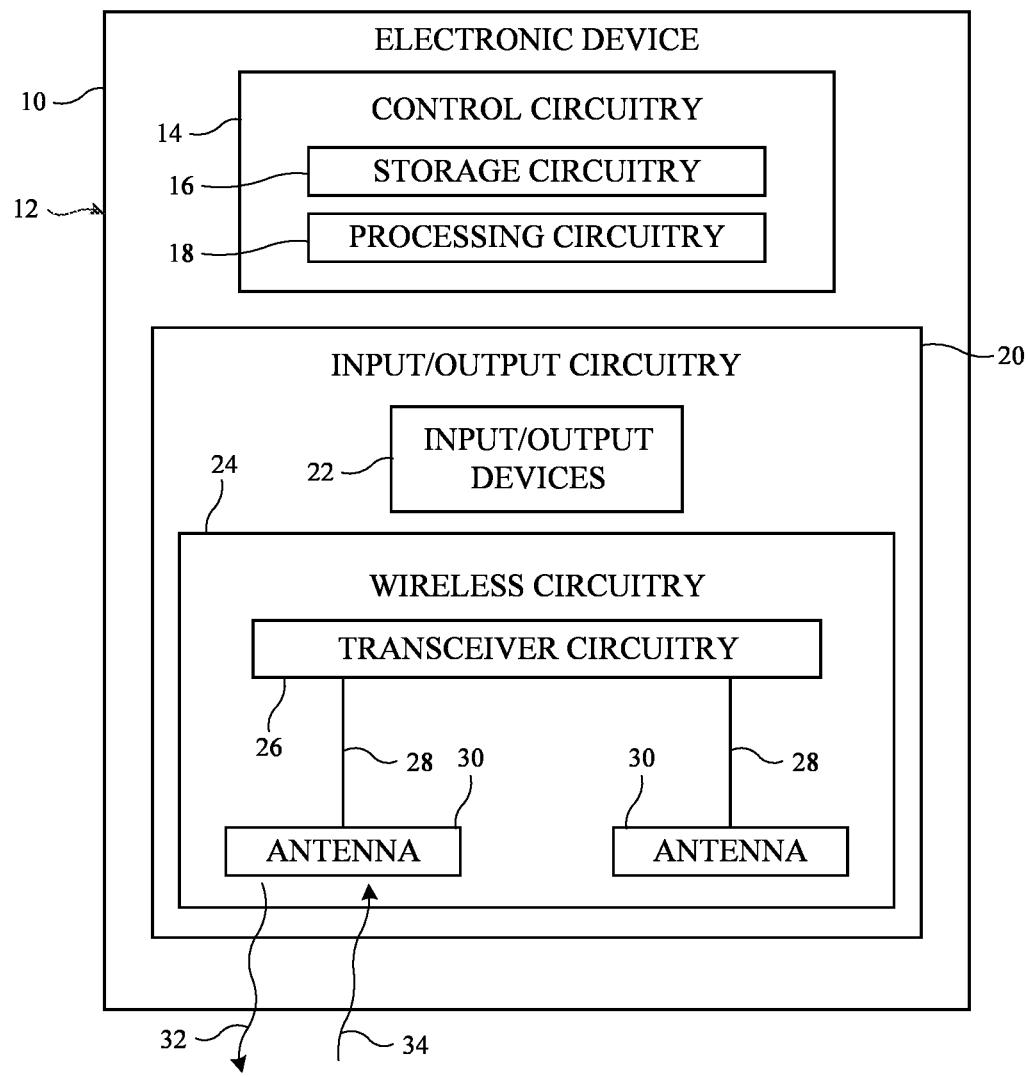
FIG. 1 is a block diagram of an illustrative electronic device having wireless circuitry with antennas that convey wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30. Wireless circuitry 24 may also include transceiver circuitry 26. Transceiver circuitry 26 may include transmitter circuitry (e.g., one or more transmitters), receiver circuitry (e.g., one or more receivers), modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by transceiver circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than about 100 GHz.

As shown in FIG. 1, wireless circuitry 24 may transmit wireless signals 32 and may receive wireless signals 34 at frequencies greater than around 100 GHz (e.g., greater than 70 GHz, 80 GHz, 90 GHz, 110 GHz, etc.). Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 1 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

In some scenarios, different antennas 30 are used to transmit THF signals 32 than are used to receive THF signals 34. If desired, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and/or that receives THF signals 34 within a corresponding signal beam oriented in a selected beam pointing direction.

Figure 2:
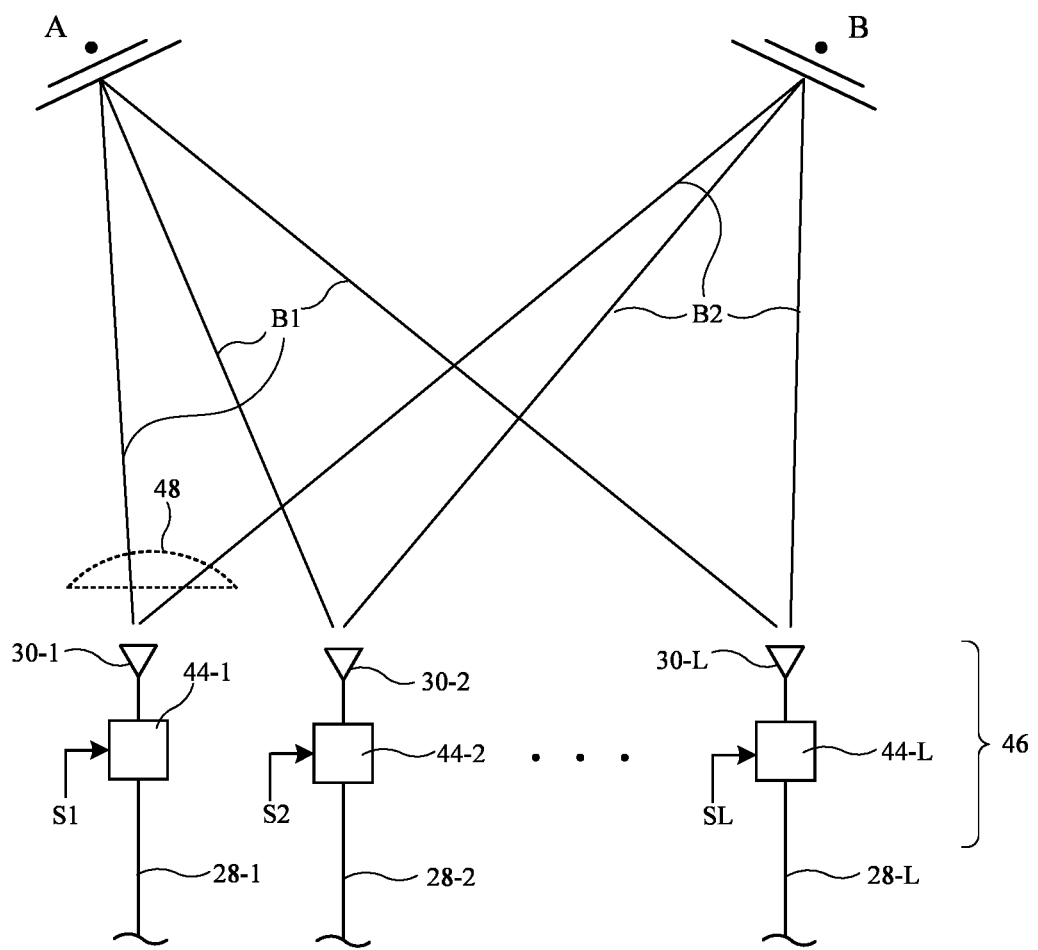
FIG. 2 is a diagram of an illustrative phased antenna array that may be adjusted to form beams of signals oriented in different directions in accordance with some embodiments.

FIG. 2 is a diagram showing how a set of L antennas 30 may be integrated into a corresponding phased antenna array 46. As shown in FIG. 2, phased antenna array 46 (sometimes referred to herein as array 46, antenna array 46, or array 46 of antennas 30) may be coupled to signal paths 28. For example, a first antenna 30-1 in phased antenna array 46 may be coupled to a first signal path 28-1, a second antenna 30-2 in phased antenna array 46 may be coupled to a second signal path 28-2, an Lth antenna 30-L in phased antenna array 46 may be coupled to an Lth signal path 28-L, etc. While antennas 30 are described herein as forming a phased antenna array, the antennas 30 in phased antenna array 46 may sometimes also be referred to as collectively forming a single phased array antenna (e.g., where antennas 30 form antenna elements of the phased array antenna).

Antennas 30 in phased antenna array 46 may be arranged in any desired number of rows and columns or in any other desired pattern (e.g., the antennas need not be arranged in a grid pattern having rows and columns and may be arranged in a uniform linear array (ULA) pattern, a non-uniform pattern, a sparse or distributed pattern, a circular pattern, or other patterns). Each antenna 30 may be separated from one or more adjacent antennas 30 in phased antenna array 46 by a predetermined distance such as approximately half an effective wavelength of operation of the array. During signal transmission, signal paths 28 may be used to supply signals (e.g., radio-frequency signals such as millimeter wave and/or centimeter wave signals) from transceiver circuitry to phased antenna array 46 for wireless transmission. During signal reception, signal paths 28 may be used to supply signals received at phased antenna array 46 (e.g., from external wireless equipment or transmitted signals that have been reflected off of external objects) to transceiver circuitry.

The use of multiple antennas 30 in phased antenna array 46 allows beam forming/steering arrangements to be implemented by controlling the relative phases and magnitudes (amplitudes) of the radio-frequency signals conveyed by the antennas. In the example of FIG. 2, antennas 30 each have a corresponding phase shifter 44 (e.g., a first phase shifter 44-1 interposed on signal path 28-1 may control phase for radio-frequency signals handled by antenna 30-1, a second phase shifter 44-2 interposed on signal path 28-2 may control phase for radio-frequency signals handled by antenna 30-2, an Lth phase shifter 44-L interposed on signal path 28-L may control phase for radio-frequency signals handled by antenna 30-L, etc.).

Phase shifters 44 may each include circuitry for adjusting the phase of the radio-frequency signals on signal paths 28 (e.g., phase shifter circuits). If desired, phase shifters 44 may also include circuitry for adjusting the magnitude of the radio-frequency signals on signal paths 28 (e.g., power amplifier and/or low noise amplifier circuits). Phase shifters 44 may sometimes be referred to collectively herein as beam steering circuitry or beam forming circuitry (e.g., beam steering/forming circuitry that steers/forms the beam of radio-frequency signals transmitted and/or received by phased antenna array 46).

Phase shifters 44 may adjust the relative phases of the transmitted signals that are provided to each of the antennas in phased antenna array 46 and may adjust the relative phases of the received signals that are received by phased antenna array 46. Phase shifters 44 may, if desired, include phase detection circuitry for detecting the phases of the received signals that are received by phased antenna array 46. The term "beam" or "signal beam" may be used herein to collectively refer to wireless signals that are transmitted and/or received by phased antenna array 46 in a particular direction. Each beam may exhibit a peak gain that is oriented in a respective beam pointing direction at a corresponding beam pointing angle (e.g., based on constructive and destructive interference from the combination of signals from each antenna in the phased antenna array). Different sets of phase settings for phase shifters 44 may configure phased antenna array 46 to form different beams in different beam pointing directions.

If, for example, phase shifters 44 are adjusted to produce a first set of phases (and/or magnitudes), the signals will form a beam as shown by beam B1 of FIG. 2 that is oriented in the direction of point A. If, however, phase shifters 44 are adjusted to produce a second set of phases (and/or magnitudes), the signals will form a beam as shown by beam B2 that is oriented in the direction of point B. Each phase shifter 44 may be controlled to produce a desired phase and/or magnitude based on a corresponding control signal S received from control circuitry 14 of FIG. 1 (e.g., the phase and/or magnitude provided by phase shifter 44-1 may be controlled using control signal S1, the phase and/or magnitude provided by phase shifter 44-2 may be controlled using control signal S2, the phase and/or magnitude provided by phase shifter 44-L may be controlled using control signal SL, etc.). If desired, the control circuitry may actively adjust control signals S in real time to steer (form) the beam in different desired directions over time. Phase shifters 44 may provide information identifying the phase of received signals to control circuitry 14 if desired.

When performing wireless communications using radio-frequency signals at relatively high frequencies such as millimeter wave, centimeter wave, and sub-THz frequencies, radio-frequency signals are conveyed over a line-of-sight path between phased antenna array 46 and external communications equipment. If the external equipment is located at point A of FIG. 2, phase shifters 44 may be adjusted to steer the signal beam towards point A (e.g., to steer the pointing direction of the signal beam towards point A). Phased antenna array 46 may transmit and receive radio-frequency signals in the direction of point A. Similarly, if the external equipment is located at point B, phase shifters 44 may be adjusted to steer the signal beam towards point B (e.g., to steer the pointing direction of the signal beam towards point B). Phased antenna array 46 may transmit and receive radio-frequency signals in the direction of point B.

In the example of FIG. 2, beam steering is shown as being performed over a single degree of freedom for the sake of simplicity (e.g., towards the left and right on the page of FIG. 2). However, in practice, the beam may be steered over two or more degrees of freedom (e.g., in three dimensions, into and out of the page and to the left and right on the page of FIG. 2). Phased antenna array 46 may have a corresponding field of view over which beam steering can be performed (e.g., in a hemisphere or a segment of a hemisphere over the phased antenna array).

If desired, one or more radio-frequency lenses such as radio-frequency lens 48 may be disposed over phased antenna array 46. The antennas 30 in phased antenna array 46 may convey radio-frequency signals through the radio-frequency lenses. The radio-frequency lens(es) may help to direct or focus the radio-frequency signals onto the antennas or in different directions. Each antenna 30 in phased antenna array 46 may be provided with a different respective overlapping lens 48, two or more antennas 30 may share the same overlapping lens 48, or a single lens 48 may overlap all the antennas 30 in phased antenna array 46.

To handle radio-frequency signals at high frequencies such as THF signals 34, transceiver circuitry 26 (FIG. 1) may include a receiver that is implemented as an electro-optical receiver. The electro-optical receiver may use optical local oscillator signals to receive THF signals 34 using phased antenna array 46. Phased antenna array 46 may therefore be an electro-optical phased antenna array. In these examples, phase shifters 44 are optical phase shifters that operate on optical signals. Phase shifters 44 may therefore sometimes be referred to herein as optical phase shifters 44.

Figure 3:
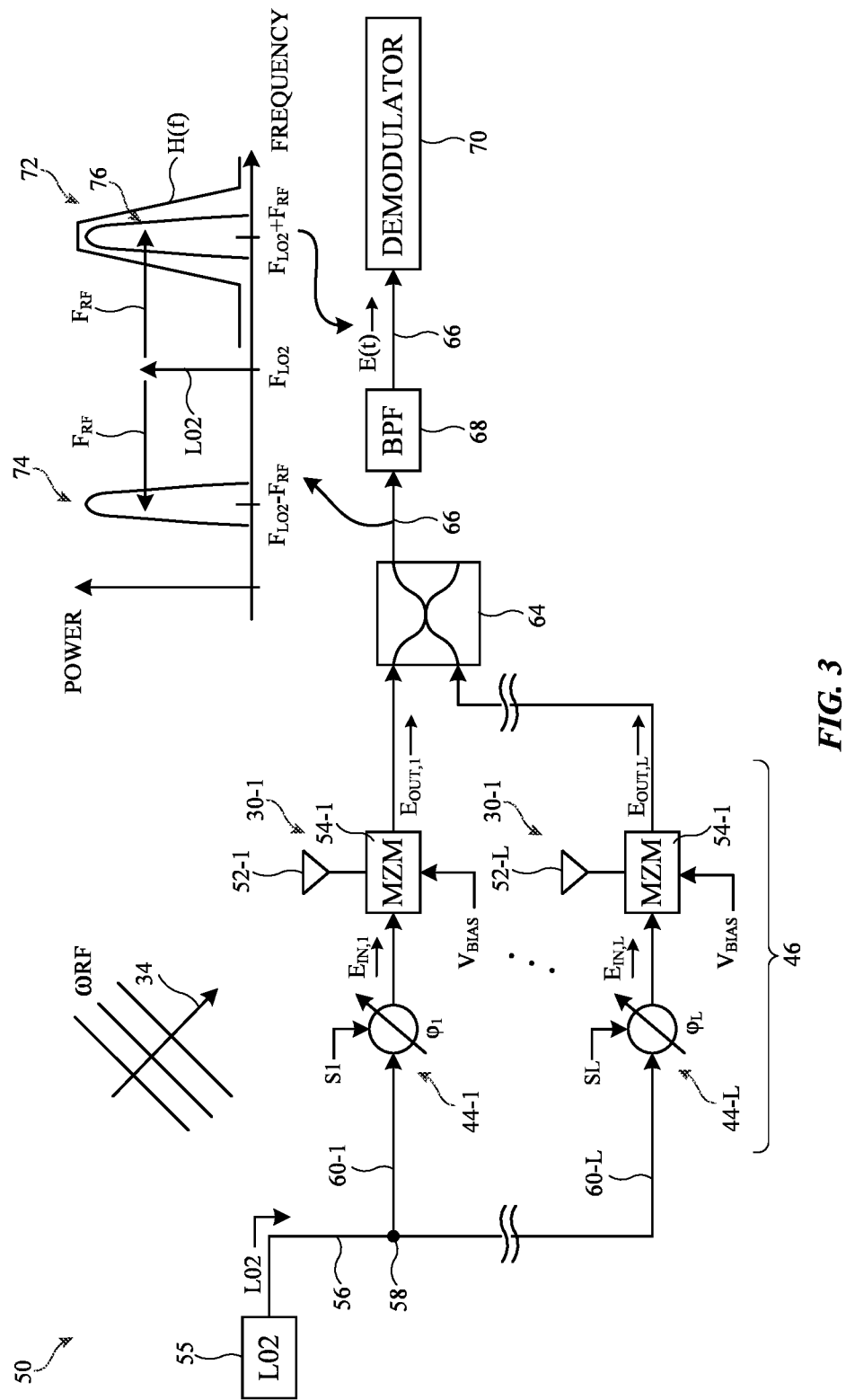
FIG. 3 is a circuit diagram of an illustrative electro-optical receiver that receives wireless signals greater than about 100 GHz using a phased antenna array in accordance with some embodiments.

FIG. 3 is a circuit diagram showing how an illustrative electro-optical receiver in transceiver circuitry 26 (FIG. 1) may receive THF signals 34 using phased antenna array 46 (e.g., an electro-optical phased antenna array). As shown in FIG. 3, the transceiver circuitry may include an electro-optical receiver such as receiver 50.

Receiver 50 may include optical components such as an optical local oscillator (LO) light source (emitter) 55, optical combiner 64, band pass filter (BPF) 68, demodulator 70, optical splitter 58, and optical paths 56, 60, and 66. Optical path 66 and portions of optical paths 60 may form the signal paths 28 (FIG. 1) that couple receiver 50 to the L antennas 30 in phased antenna array 46. Optical paths 66, 60, and 56 may each include one or more optical fibers and/or waveguides, for example.

LO light source 55 may include one or more light sources such as laser light sources, laser diodes, optical phase locked loops, or other optical emitters that emit light as optical local oscillator signal LO2. Optical local oscillator signal LO2 may be a narrowband signal at a frequency $f_{LO2}$, corresponding to an optical wavelength. Optical path 56 may couple LO light source 55 to the input of optical splitter 58. Optical splitter 58 may have outputs (optically) coupled to the inputs of optical combiner 64 over L different parallel optical paths 60 (e.g., there may be L optical paths 60 coupled in parallel between L different outputs of optical splitter 58 and L different inputs of optical combiner 64). Only the first optical path 60-1 and the Lth optical path 60-L in receiver 50 are shown between optical splitter 58 and optical combiner 64 in the example of FIG. 3 for the sake of clarity.

Optical combiner 64 may have an output coupled to the input of demodulator 70 over optical path 66. BPF 68 may be disposed on optical path 66 between optical combiner 64 and demodulator 70. The input of BPF 68 may be (optically) coupled to the output of optical combiner 64. The output of BPF 68 may be (optically) coupled to the input of demodulator 70. BPF 68 may be, for example, an optical BPF having a transfer function H(f) that defines the optical passband of BPF 68.

Demodulator 70 may include demodulation circuitry for demodulating wireless data from an optical signal received over its input coupled to optical path 66. Demodulator 70 may include, for example, an orthogonal frequency division multiplexing (OFDM) demodulator (or another demodulator depending on the modulation scheme used to convey THF signals 34), downconverters (e.g., for downconverting from optical frequencies at optical path 66 to an intermediate (radio) frequency and from the intermediate (radio) frequency to baseband, for downconverting from optical frequencies to baseband, etc.), high speed/bandwidth analog-to-digital converters (ADCs), fast Fourier transforms (FFTs), and/or any other desired circuitry for extracting (e.g., decoding and/or demodulating) wireless data (information) from THF signals 34, as conveyed by optical signals on optical path 66.

As shown in FIG. 3, each optical path 6 may have a respective phase shifter 44 and a respective electro-optical modulator 54 disposed thereon and coupled in series between optical splitter 58 and optical combine 64. For example, optical path 60-1 may have a first phase shifter 44-1 and a first electro-optical modulator 54-1 coupled in series between optical splitter 58 and optical combiner 64, optical path 60-L may have an Lth phase shifter 44-L and an Lth electro-optical modulator 54-L coupled in series between optical splitter 58 and optical combiner 64, etc.

Electro-optical modulators 54 (sometimes referred to herein simply as optical modulators 54) may include, for example, Mach-Zehnder modulators (MZM) or other electro-optical modulators. Electro-optical modulators 54 may therefore sometimes also be referred to herein as MZMs 54.

Each one of the L optical paths 60 may have a respective one of the L antennas 30 from phased antenna array 46 disposed thereon. For example, antenna 30-1 in phased antenna array 46 may be disposed on optical path 60-1, antenna 30-L in phased antenna array 46 may be disposed on optical path 60-L, etc. Each antenna 30 may include the electro-optical modulator 54 on its corresponding optical path 60 and a respective antenna resonating element 52 coupled to the electro-optical modulator 54 (e.g., to one or more electrodes or terminals of the electro-optical modulator). For example, antenna 30-1 may include electro-optical modulator 54-1 and an antenna resonating element 52-1 coupled to electro-optical modulator 54-1, antenna 30-L may include electro-optical modulator 54-L and an antenna resonating element 52-L coupled to electro-optical modulator 54-L, etc. Antenna resonating elements 52 may each include radiating (resonating) element arms (electrically) coupled to the corresponding electro-optical modulator 54. Antenna resonating elements 52 may each include two opposing resonating element arms (e.g., bowtie arms or dipole arms), monopole elements, patch elements, slot elements, radiating waveguides, dielectric resonators, inverted-F resonating elements, or any other desired resonating element structures.

Optical phase shifters 44 may receive control signals S that control the optical phase shifters to apply different optical phase shifts $\varphi_1$ to optical signals on their respective optical paths 60. For example, optical phase shifter 44-1 may receive control signal S1 that controls optical phase shifter to apply optical phase shift $\varphi_1$ to optical signals on optical path 60-1, optical phase shifter 44-L may receive control signal SL that controls the optical phase shifter to apply optical phase shift $\varphi_L$ to optical signals on optical path 60-L, etc. If desired, optical phase shifters 44 may be implemented using plasmonics technology.

Electro-optical modulators 54 may modulate electrical signals onto optical signals propagating along optical paths 60. For example, electro-optical modulators 54 may modulate, onto optical signals propagating along optical paths 60, electrical signals produced on antenna resonating element arms 52 by incident THF signals 34 (e.g., antenna currents produced on antenna resonating element arms 52 by incident THF signals 34 and conveyed to electrode(s) on electro-optical modulators 54). Electro-optical modulators 54 may receive bias voltages $V_{BIAS}$ that control how the electro-optical modulators modulate the electrical signals onto the optical signals.

During signal reception, wavefronts of THF signals 34 are incident upon phased antenna array 46 at an arbitrary angle. The THF signals may have a corresponding radio frequency $f_{RF}$ (e.g., a sub-THz frequency between around 100-1000 GHz). The radio frequency may correspond to an angular frequency of $\omega_{RF}$. THF signals 34 may also carry modulated wireless data (e.g., as produced by the transmitting device), characterized by a modulation function m(t).

Each of the L optical paths 60, the L antennas 30, the L electro-optical modulators 54, the L antenna resonating elements 52, and the L phase shifters 44 of phased antenna array 46 may be labeled by a corresponding index l=1, . . . , L. The angle of incidence of THF signals 34 may cause the wavefronts to be incident upon different antennas 30 of phased antenna array 46 at slightly different times, generally characterized by a time delay $\tau_1$ (e.g., a phase front run time differential) for the lth antenna 30 in phased antenna array 46. Time delay $\tau_1$ may be greater for antennas 30 for which the wavefronts have to travel a farther distance (given the angle of incidence of THF signals 34) than for antennas 30 for which the wavefronts have to a travel shorter distance (e.g., under a uniform linear array assumption).

At the same time, LO light source 55 may emit optical local oscillator signal LO2 onto optical path 56 (e.g., may illuminate optical path 56 using optical local oscillator signal LO2). Optical splitter 58 may distribute optical local oscillator signal LO2 onto optical paths 60. Each phase shifter 44 may apply a respective optical phase shift $\varphi_1$ to the optical local oscillator signal LO2 on optical paths 60 to produce (optical) input signals $E_{IN,1}$, which are provided to the input of the corresponding electro-optical modulator 54. For example, phase shifter 44-1 may apply optical phase shift $\varphi_1$ to optical local oscillator signal LO2 to produce an input signal $E_{IN,1}$ provided to electro-optical modulator 54-1, phase shifter 44-L may apply optical phase shift $\varphi_1$ to optical local oscillator signal LO2 to produce an input signal $E_{IN,L}$ provided to electro-optical modulator 54-L, etc.

Antenna resonating elements 52 may receive THF signals 34. THF signals 34 may produce antenna currents on antenna resonating elements 52 (e.g., at frequency $f_{RF}$). Antenna resonating elements 52 may pass the antenna currents to the electrode(s) of the corresponding electro-optical modulator 54. Electro-optical modulator 54 may modulate optical local oscillator signal LO2 (e.g., the phase-shifted input signals $E_{IN,1}$) using the electrical signal (the antenna currents) to produce output signals $E_{OUT,1}$. Output signals $EM_{OUT,1}$ are optical signals at optical frequencies but have been modulated using the electrical signals and thus carry the wireless data (information) conveyed in THF signals 34. For example, electro-optical modulator 54-1 may generate output signal $E_{OUT,1}$ by modulating the electrical signal from antenna resonating element 52-1 onto input signal $E_{IN,1}$, electro-optical modulator 54-L may generate output signal $E_{OUT,L}$ by modulating the electrical signal from antenna resonating element 52-L onto input signal $E_{IN,L}$, etc.

Optical combiner 64 may combine (e.g., add) all of the L output signals $E_{OUT,1}$ produced by phased antenna array 46 together to output the corresponding combined (added) signal onto optical path 66. BPF 68 may filter the combined signal to produce filtered optical signal E(t), which is provided to demodulator 70. Demodulator 70 may demodulate filtered optical signal E(t) to recover (decode) the wireless data conveyed in THF signals 34 (e.g., as encoded by modulation m(t) in THF signals 34). If desired, demodulator 70 may downconvert filtered optical signal E(t) to an intermediate (radio) frequency or baseband prior to decoding the wireless data.

Plot 72 of FIG. 3 shows the combined signal output by optical combiner 64 onto optical path 66 (in units of power as a function of frequency). As shown in plot 72, the combined signal includes optical local oscillator signal LO2 at frequency $f_{LO2}$ (e.g., an optical frequency such as 200,000 GHz or another optical frequency). When electro-optical modulators 54 modulate the electrical signals from antenna resonating elements 52 onto the optical local oscillator signal, the electro-optical modulators may produce a first modulated optical signal 74 in a first sideband below frequency $f_{LO2}$ (e.g., at frequency $f_{LO2}-f_{RF}$) and a second modulated optical signal 76 in a second sideband above frequency $f_{LO2}$ (e.g., at frequency $f_{LO2}+f_{RF}$). Each sideband is separated from frequency $f_{LO2}$ by the frequency of THF signals 34, $f_{RF}$.

BPF 68 may serve to filter out one of the sidebands and the optical local oscillator signal LO2 from the combined signal to produce filtered optical signal E(t). For example, BPF 68 may have a passband (e.g., as defined by transfer function H(f)) that overlaps modulated signal 76 (e.g., frequencies around $f_{LO2}+f_{RF}$) but that does not overlap optical local oscillator signal LO2 (e.g., frequency $f_{LO2}$) and modulated signal 4 (e.g., frequencies around $f_{LO2}-f_{RF}$). This configures BPF 68 to pass only modulated signal 76 to demodulator 70 (as filtered optical signal E(t)). Demodulator 70 may thereby recover the wireless data from THF signals 34 by demodulating only modulated signal 76. Alternatively, the passband may overlap modulated signal 74 but not modulated signal 76.

Filtered optical signal E(t) may be described mathematically by equation 1, for example.

$$E(t) = \sum_{l=1}^{L} E_{LO2} e^{j\omega_{LO2}(t-TD_l)} \cdot m(t) e^{j\omega_{RF}(t-\tau_l)} \quad (1)$$

In equation 1, the sum is performed over each of the L output signals $E_{OUT,1}$ produced on each of the L optical paths 60 (e.g., as produced by combination of the output signals at optical combiner 64). The first term of the sum corresponds to the input signal $E_{IN,1}$ provided to the electro-optical modulator 54-1 in the lth optical path 60-1 (e.g., the optical signals provided to the electro-optical modulator). The second term of the sum corresponds to the THF signals 34 received by the antenna resonating element 52-1 in the lth antenna 30-1 on the lth optical path 60-1 (e.g., the electrical signals provided to the electro-optical modulator 54-1 in the lth optical path and modulated onto the optical signals provided to the electro-optical modulator, as represented by the first term of the sum).

In equation 1, $E_{LO2}$ is the field amplitude of optical local oscillator signal LO2, j is the square root of −1, $\omega_{LO2}$ is the angular frequency of optical local oscillator signal LO2 (corresponding to frequency $f_{LO2}$), and $TD_l$ is the time delay introduced by the lth phase shifter 44-1 to optical local oscillator signal LO2 in the lth optical path 60-1 (e.g., the true time delay corresponding to (producing) the optical phase shift $\varphi_l$ for that optical path). Optical phase shift $\varphi_l$ and thus time delay $TD_l$ may, for example, compensate for the variation in run time of the impinging phase front of THF signals 34 due to the waves of THF signals 34 not arriving at each of the antennas 30-1 at the same time given the angle of arrival of THF signals 34. Equation 1 may be simplified as shown in equation 2.

$$E(t) = E_{LO2} \cdot m(t) \sum_{l=1}^{L} e^{j((\omega_{LO2}+\omega_{RF})t-\varphi_l-\omega_{RF}\tau_l)} \quad (2)$$

As shown by equation 2, the introduced phase shift due to run time $\omega_{RF}\tau_l$ (e.g., from the angle of arrival of THF signals 34) for each antenna 30-1 and each optical path 60-1 can be compensated by the optical phase shift $\varphi_l$ introduced to optical local oscillator signal LO2 for that antenna and optical path. In other words, the L phase shifters 44 and optical combiner 64 may serve to effectively synthesize an antenna array response for phased antenna array 46 (e.g., in the optical domain). Demodulator 70 may then recover the wireless data in the received THF signals by demodulating (decoding) the modulation m(t) in filtered signals E(t).

The example of FIG. 3 is illustrative and non-limiting. Rather than being coupled between electro-optical modulators 54 and LO light source 55, phase shifters 44 may, if desired, be coupled between electro-optical modulators 54 and optical combiner 64. In these implementations, absolute phase would need to be considered rather than a modulo 360-degree phase of the optical local oscillator signal before the electro-optical modulator, due to the presence of modulation m(t) on top of the signal. In other implementations, phase shifters 44 may be integrated into electro-optical modulators 54 (e.g., when electro-optical modulators 54 are implemented using plasmonics technology). Electro-optical modulators 54 may, for example, include a pair of optical phase shifters that are controlled by electrodes that receive electrical signals from antenna resonating elements 52. The optical phase shifters may be adapted and/or controlled (e.g., using a biasing voltage or control signals) to impart the corresponding optical phase shifts 91 on top of performing electro-optical modulation.

Figure 4:
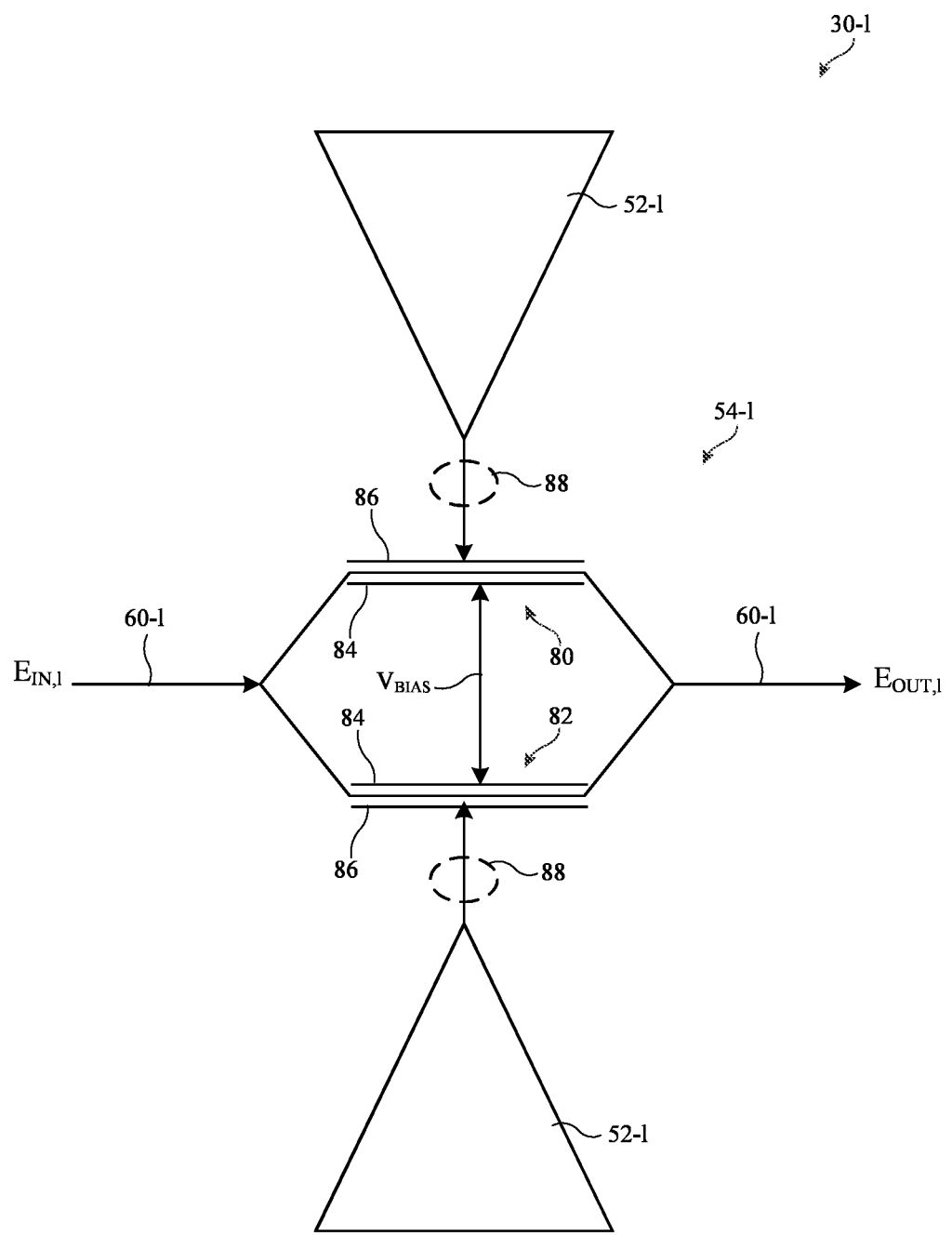
FIG. 4 is a top view of an illustrative antenna that may be integrated into an electro-optical receiver of the type shown in FIG. 4 in accordance with some embodiments.

FIG. 4 is a diagram of an lth antenna 30-1 from phased antenna array 46. As shown in FIG. 4, antenna 30-1 may include antenna resonating element 52-1 coupled to electro-optical modulator 54-1. Antenna resonating element 52-1 may include one or more radiating (resonating) element arms or other resonating elements. In the example of FIG. 4, antenna 30-1 is a planar dipole antenna (sometimes referred to as a "bowtie" antenna) having an antenna resonating element 52-1 with two opposing resonating element arms (e.g., bowtie arms or dipole arms). This is illustrative and, in general, antenna 30 may be any type of antenna having any desired antenna radiating element architecture.

As shown in FIG. 4, electro-optical modulator 54-1 (e.g., an MZM) may include a first optical arm, branch, or path such as optical arm 80 and may include a second optical arm, branch, or path, such as optical arm 82. Optical arms 80 and 82 may be disposed on optical path 60-1. Optical arms 80 and 82 may both receive (optical) input signal $E_{IN,1}$ at the same point in optical path 60-1 and may both output (optical) output signal $E_{OUT,1}$ at the same point in optical path 60-1. Optical arms 80 and 82 may each be coupled between electrodes 86 and 84. Electrode 84 may receive bias voltage $V_{BIAS}$.

During signal reception, incident THF signals 34 produce electrical signals (antenna current at frequency $f_{RF}$ on antenna resonating element 52-1. Antenna resonating element 52-1 may be coupled to electrode 86 and may provide the electrical signals (antenna current) to electrode 86. If desired, amplifiers (e.g., a power amplifier, low noise amplifier, etc.) may be electrically coupled between antenna resonating element 52-1 and electrode 86 (e.g., at location 88). Propagating optical local oscillator signal LO2 (e.g., as input signal $E_{IN,1}$) along optical arms 80 and 82 may, in the presence of a voltage signal applied to one or both arms (e.g., from the electrical signals produced by antenna resonating element 52-1), allow different optical phase shifts to be imparted on each optical arm before recombining the signal at the output of the antenna as output signal $E_{OUT,1}$ (e.g., where optical phase modulations produced on the arms are converted to intensity modulations at the output of electro-optical modulator 54-1).

Since the voltage applied to arms 80 and 82 includes wireless data (e.g., as received in THF signals 34), electro-optical modulator 54-1 modulates the wireless data onto input signal $E_{IN,1}$, thereby producing output signal $E_{OUT,1}$. In implementations where phase shifter 44 is integrated into electro-optical modulator 54-1, the arms 80 and 82 may be further controlled to impart optical phase shift $\varphi_1$ to input signal $E_{IN,1}$. If desired, electro-optical modulator 54 and/or the phase shifter may be implemented using plasmonics technology. In these implementations, amplifiers at location 88 may be omitted. If desired, control circuitry 14 (FIG. 1) may provide bias voltage $V_{BIAS}$ with different magnitudes to place electro-optical modulator 54 into different operating modes (e.g., operating modes that suppress optical carrier signals, operating modes that do not suppress optical carrier signals, etc.).

Figure 5:
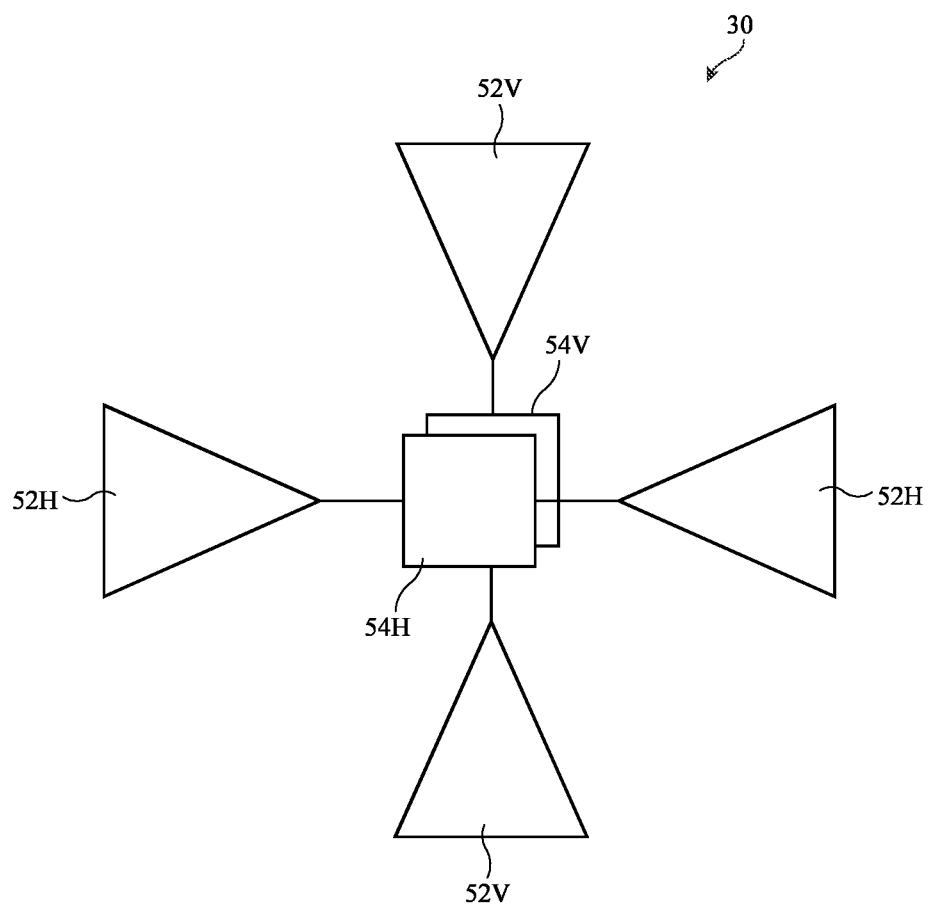
FIG. 5 is a top view of an illustrative antenna for covering multiple polarizations that may be integrated into an electro-optical receiver of the type shown in FIG. 4 in accordance with some embodiments.

The antennas 30 of FIGS. 1-4 may support reception of THF signals 34 with a given polarization (e.g., a linear polarization such as a vertical polarization). If desired, each antenna 30 may be configured to cover multiple different polarizations. FIG. 5 is a diagram showing one example of how a given antenna 30 may be configured to cover multiple different polarizations.

As shown in FIG. 5, antenna 30 may include a first antenna resonating element 52V coupled to a first electro-optical modulator 54V for covering a first polarization (e.g., a first linear polarization such as a vertical polarization) and may include a second antenna resonating element 52H coupled to a second electro-optical modulator 54H for covering a second polarization different from or orthogonal to the first polarization (e.g., a second linear polarization such as a horizontal polarization). Antenna resonating element 52V may be configured to receive the first polarization of THF signals 34 whereas antenna resonating element 52H is configured to receive the second polarization of THF signals 34 (e.g., antenna resonating element 52V may be oriented perpendicular to antenna resonating element 52H).

Electro-optical modulator 54V may modulate the electrical signals received over antenna resonating element 52V with the first polarization onto the optical local oscillator signal and electro-optical modulator 54H may modulate the electrical signals received over antenna resonating element 52H with the second polarization onto the optical local oscillator signal. To minimize space within device 10, antenna resonating element 52V and electro-optical modulator 54V may be vertically stacked over or under antenna resonating element 52H and electro-optical modulator 5H. In this example, antenna 30 may both be disposed on a substrate such as a rigid or flexible printed circuit board. The substrate may include multiple stacked dielectric layers (e.g., layers of ceramic, epoxy, flexible printed circuit board material, rigid printed circuit board material, etc.). The antenna resonating element 52V and electro-optical modulator 54V may be disposed on a first layer of the substrate whereas antenna resonating element 52H and electro-optical modulator 54H are disposed on a second layer of the substrate.

If desired, the same optical local oscillator signal LO2 provided with the same optical phase shift $\varphi$ may be provided to both electro-optical modulators 54H and 54V (e.g., when the first and second polarizations use the same array response). In other implementations (e.g., when the first and second polarizations use different array responses), the optical local oscillator signal LO2 provided to electro-optical modulator 54V may be provided with a first optical phase shift $\varphi$ (e.g., associated with a first array response) whereas the optical local oscillator signal LO2 provided to electro-optical modulator 54H may be provided with a second optical phase shift $\varphi$ (e.g., associated with a second array response). Other antenna architectures may be used if desired. If desired, the antennas 30 in FIGS. 3-5 may be configured to also transmit THF signals. In these implementations, electro-optical modulators 54 may be replaced with photodiodes such as uni-traveling-carrier (UTC) photodiodes that are illuminated using first and second optical local oscillator signals and that receive bias voltages that control the antennas to switch between transmit and receive modes. The photodiodes may be implemented using plasmonics technology if desired.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-5 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device comprising:
 a light source;
 a demodulator;
 an optical path between the light source and the demodulator;
 an electro-optical modulator disposed on the optical path and having an electrode; and
 an antenna resonating element coupled to the electrode of the electro-optical modulator and configured to receive radio-frequency signals, the demodulator being configured to extract wireless data modulated onto the radio-frequency signals by an external device.

2. The electronic device of claim 1, wherein the electro-optical modulator comprises a Mach-Zehnder Modulator (MZM).

3. The electronic device of claim 1, further comprising:
 an amplifier coupled between the antenna resonating element and the electrode.

4. The electronic device of claim 1, further comprising:
 an additional electro-optical modulator disposed on the optical path and having an additional electrode; and
 an additional antenna resonating element coupled to the additional electrode, wherein the electro-optical modulator overlaps the additional electro-optical modulator and the antenna resonating element is oriented orthogonal to the additional antenna resonating element.

5. The electronic device of claim 1, further comprising:
an optical phase shifter disposed on the optical path between the light source and the electro-optical modulator.

6. The electronic device of claim 1, further comprising:
an optical phase shifter disposed on the optical path between the electro-optical modulator and the demodulator.

7. The electronic device of claim 1, wherein the light source is configured to generate an optical signal on the optical path and the electro-optical modulator is configured to modulate an electrical signal from the antenna resonating element onto the optical signal on the optical path.

8. The electronic device of claim 7, wherein the electro-optical modulator is further configured to apply an optical phase shift to the optical signal on the optical path, the electro-optical modulator being implemented using plasmonics technology.

9. The electronic device of claim 1, further comprising:
an additional optical path between the light source and the demodulator;
an additional electro-optical modulator disposed on the additional optical path and having an additional electrode;
an additional antenna resonating element coupled to the additional electrode; and
an optical combiner that couples the optical path and the additional optical path to the demodulator.

10. The electronic device of claim 9, further comprising:
an optical band pass filter (BPF) coupled between the optical combiner and the demodulator.

11. The electronic device of claim 9, further comprising:
a phased antenna array configured to receive radio-frequency signals at a frequency between 100 GHz and 10 THz, the phased antenna array having a first antenna that includes the antenna resonating element and the electro-optical modulator, and the phased antenna array having a second antenna that includes the additional antenna resonating element and the additional electro-optical modulator.

12. The electronic device of claim 1, wherein the wireless data comprises wireless data packets.

13. An electronic device comprising:
a light source;
a demodulator;
an optical path between the light source and the demodulator;
an electro-optical modulator disposed on the optical path and having an electrode;
an antenna resonating element coupled to the electrode of the electro-optical modulator; and
an amplifier that couples the antenna resonating element to the electrode.

14. The electronic device of claim 13, wherein the electro-optical modulator comprises:
a first optical arm, the first optical arm extending along the electrode;
a second optical arm; and
an additional electrode that extends along the second optical arm.

15. The electronic device of claim 14, wherein the antenna resonating element has a first radiating arm coupled to the electrode and has a second radiating arm coupled to the additional electrode, the amplifier being coupled between the first radiating arm and the electrode, the electronic device further comprising an additional amplifier that couples the second radiating arm to the additional electrode.

16. The electronic device of claim 13, wherein the amplifier is configured to amplify a radio-frequency current conveyed from the antenna resonating element to the electrode.

17. The electronic device of claim 16, further comprising:
an optical phase shifter disposed on the optical path between the electro-optical modulator and the light source.

18. The electronic device of claim 16, further comprising:
an optical phase shifter disposed on the optical path between the electro-optical modulator and the demodulator.

19. An electronic device comprising:
a light source;
a demodulator;
an optical path between the light source and the demodulator;
an electro-optical modulator disposed on the optical path and having an electrode;
an antenna resonating element coupled to the electrode of the electro-optical modulator; and
an optical phase shifter disposed on the optical path between the optical light source and the electro-optical modulator.

20. The electronic device of claim 19, wherein the electro-optical modulator has a first optical arm and a second optical arm parallel to the first optical arm, the electrode is coupled to the first optical arm, and the optical phase shifter is separate from the electro-optical modulator.

21. The electronic device of claim 19, wherein the demodulator comprises an orthogonal frequency division multiplexing (OFDM) demodulator.

* * * * *